(12) United States Patent
Tavis et al.

(10) Patent No.: US 7,711,775 B2
(45) Date of Patent: May 4, 2010

(54) METHOD AND APPARATUS FOR MANAGING SOFTWARE COMPONENT DOWNLOADS AND UPDATES

(75) Inventors: Michael A. Tavis, Stow, MA (US); Jack E. Ozzie, Chester, NH (US)

(73) Assignee: Groove Networks, Inc., Beverly, MA (US)

( * ) Notice: Subject to any disclaimer, the term of this patent is extended or adjusted under 35 U.S.C. 154(b) by 1144 days.

(21) Appl. No.: 10/032,709

(22) Filed: Oct. 24, 2001

(65) Prior Publication Data

US 2003/0084138 A1 May 1, 2003

(51) Int. Cl.
*G06F 15/16* (2006.01)
*G06F 15/173* (2006.01)

(52) U.S. Cl. ............... 709/205; 709/204; 709/201; 709/225

(58) Field of Classification Search ........... 709/225, 709/205, 201, 204
See application file for complete search history.

(56) References Cited

U.S. PATENT DOCUMENTS

| | | | |
|---|---|---|---|
| 5,809,287 A | | 9/1998 | Stupek, Jr. et al. |
| 5,913,033 A | * | 6/1999 | Grout .................. 709/219 |
| 5,974,454 A | * | 10/1999 | Apfel et al. ............ 709/221 |
| 6,078,948 A | * | 6/2000 | Podgorny et al. ...... 709/204 |
| 6,185,602 B1 | * | 2/2001 | Bayrakeri ............. 709/204 |
| 6,199,204 B1 | * | 3/2001 | Donohue .............. 717/178 |
| 6,334,141 B1 | * | 12/2001 | Varma et al. .......... 709/205 |
| 6,343,313 B1 | * | 1/2002 | Salesky et al. ......... 709/204 |
| 6,353,926 B1 | * | 3/2002 | Parthesarathy et al. .. 717/170 |
| 6,513,069 B1 | * | 1/2003 | Abato et al. ........... 709/238 |
| 6,701,345 B1 | * | 3/2004 | Carley et al. .......... 709/205 |
| 6,826,600 B1 | * | 11/2004 | Russell ................ 709/213 |
| 6,891,953 B1 | * | 5/2005 | DeMello et al. ........ 380/277 |
| 6,976,079 B1 | * | 12/2005 | Ferguson et al. ....... 709/229 |
| 2001/0029605 A1 | | 10/2001 | Forbes et al. |
| 2002/0073046 A1 | * | 6/2002 | David .................. 705/67 |
| 2002/0078203 A1 | * | 6/2002 | Greschler et al. ...... 709/225 |

(Continued)

FOREIGN PATENT DOCUMENTS

EP    0 811 942 A2    12/1997

(Continued)

OTHER PUBLICATIONS

Marimba, Inc., Software Distribution and Management, (http://www.marimba.com/products/change_management/desktop/software-distribution.shtml), 1996-2002, Marimba, Inc.

(Continued)

*Primary Examiner*—George C Neurauter, Jr.
*Assistant Examiner*—Asghar Bilgrami
(74) *Attorney, Agent, or Firm*—Wolf, Greenfield & Sacks, P.C.

(57) ABSTRACT

A component manager receives requests for component updates from a variety of sources, parses the requests and extracts URL information that identifies the location of a file containing the component resources. The component manager presents the URL to a download manager that asynchronously retrieves the component resources from the specified location and places the file in a staging area. Once the component resources have been downloaded, an install manager, also operating asynchronously from the component manager and the download manager, installs the component update.

40 Claims, 12 Drawing Sheets

U.S. PATENT DOCUMENTS

2003/0208472 A1* 11/2003 Pham .............................. 707/2
2004/0254913 A1* 12/2004 Bernstein et al. ................ 707/2

FOREIGN PATENT DOCUMENTS

EP          0 841 615  A2      5/1998

OTHER PUBLICATIONS

Microsoft, Inc., Open Software Description Element Reference, (http://msdn.microsoft.com/workshop/delivery/osd/reference/reference.asp?frame=true) 2002 Microsoft Corporation.

Von Hoff, et al., The Open Software Description Format (OSD), Submitted to W3C Aug. 13, 1997, (http://www/w3.org/TR/NOTE-OSD.html).

Marimba, Inc., Marimba Embedded Management, Creating Self-Updating Appliances and Devices, www.marimba.com, Aug. 2001.

Marimba, Inc., Understanding entralized Management of Server Content and Applications, www.marimba.com, Sep. 2000.

Marimba, Inc., OSD—Describing Software Packages on the Internet, www.marimba.com, Whitepaper: Open Software Description: May 1998.

Hall, Richard S., et al., "Evaluating Software Deployment Languages and Schema, An Experience Report", University of Colorado, Department of Computer Science, BNXDOCID, XP-002225480, cs.colorado.edu.

"Internet Development Index", Open Software Description Element Reference, 1 page, http://msdn.microsoft.com/workshop/delivery/osd/reference/reference.asp?frame=true.

"Software Distribution and Management", Marimba: Systems Management Built for e-business, 2 pages, http://www.marimba.com/cgi-bin/printpage.cgi.

"The Open Software Description Format (OSD)", Open Software Description Specification, 13 pages, http://www.w3.org/TR/NOTE-OSD.html.

"Creating Self-Updating Appliances and Devices", Marimba Embedded Management, 18 pages, Aug. 2001, www.marimba.com.

Chow, Connie, et al., "Understanding Centralized Management of Distributed Servers and Content", 16 pages, Sep. 2000.

"Whitepaper: Open Software Description", 13 pages, May 1998.

* cited by examiner

METHOD AND APPARATUS FOR MANAGING SOFTWARE COMPONENT DOWNLOADS AND UPDATES

FIELD OF THE INVENTION

This invention relates to methods and apparatus for software distribution via a network and, in particular, to methods and apparatus for downloading, authenticating and installing software components in a collaborative environment.

BACKGROUND OF THE INVENTION

New collaboration models have been developed which operate in a "peer-to-peer" fashion without the intervention of a central authority. One of these latter models is built upon direct connections between users in a shared private "space". In accordance with this model, users can be invited into, enter and leave a shared space during an ongoing collaboration session between other users. Each user has an application program called an "activity", which is operable in his or her personal computer system, communication appliance or other network-capable device which generates a shared "space" in that user's computer. The activity responds to user interactions within the shared space by generating data change requests, called "deltas." The activity also has a data-change engine component that maintains a local data copy and performs the changes to the data requested by the deltas. The deltas are distributed from one user to another over a network, such as the Internet, by a dynamics manager component. When the deltas are received by another user activity in the shared space, the local data copy maintained by that activity is also updated.

Subprograms within the activity program called "tools" perform various specific tasks. For example, an activity program might present various computer games. Within the overall game activity, tools might be available for a chess game and a tic-tac-toe game. Tools are defined by a template that is a document written in Extended Markup Language or XML. The XML template has various sections or tagged blocks that define various attributes of the tool that it defines.

An application constructed in accordance with this model consists of a collection of software components and resources, all of which are targeted for execution on a particular device. As used herein the term "components" will be used to refer to both the software code and the resources that are required for an application. This type of collaboration system is described in detail in U.S. patent application Ser. No. 09/357,007 entitled METHOD AND APPARATUS FOR ACTIVITY-BASED COLLABORATION BY A COMPUTER SYSTEM EQUIPPED WITH A COMMUNICATIONS MANAGER, filed Jul. 19, 1999 by Raymond E. Ozzie, Kenneth G. Moore, Robert H. Myhill and Brian M. Lambert; U.S. patent application Ser. No. 09/356,930 entitled METHOD AND APPARATUS FOR ACTIVITY-BASED COLLABORATION BY A COMPUTER SYSTEM EQUIPPED WITH A DYNAMICS MANAGER, filed Jul. 19, 1999 by Raymond E. Ozzie and Jack E. Ozzie; U.S. patent application Ser. No. 09/356,148 entitled METHOD AND APPARATUS FOR PRIORITIZING DATA CHANGE REQUESTS AND MAINTAINING DATA CONSISTENCY IN A DISTRIBUTED COMPUTER SYSTEM EQUIPPED FOR ACTIVITY-BASED COLLABORATION, filed Jul. 19, 1999 by Raymond E. Ozzie and Jack E. Ozzie and U.S. patent application Ser. No. 09/588,195 entitled METHOD AND APPARATUS FOR EFFICIENT MANAGEMENT OF XML DOCUMENTS, filed Jun. 6, 2000 by Raymond E. Ozzie, Kenneth G. Moore, Ransom L. Richardson and Edward J. Fischer.

Computer software developers are often releasing new or upgraded versions of their software program components in order to correct problems or to add new features that were incomplete or unavailable when the software was originally released. However, in a collaborative system, such as that described above, the distribution of software is complicated by the dynamic nature of the collaborative activity. For example, a user who is invited to join a shared space may have a software component version that is incompatible with the version being used by other members of the shared space. Consequently, the user may not be able to interact with anyone in the shared space until his or her local software component (or components) is upgraded to the current version and, since the user cannot interact with the shared space, the user may not be able to determine which component or components must be upgraded.

In fact, the user may not know that a component upgrade is necessary until he or she is at the point of joining the shared space and, thus, the software upgrade may have to made unobtrusively while the user is waiting or using the collaboration system with other shared spaces.

In addition, collaboration systems, such as that described above, are complicated and may comprise many software components. Many users will not be sufficiently knowledgeable to determine which software components need to be added, upgraded or replaced and to determine the locations at which the new components can be obtained. Some software components may incorporate other software that is located at yet other locations. The result is a complex and confusing download procedure. Other users will not be sufficiently knowledgeable to install and initialize those software components once they are obtained.

In addition, since there is no central location with which all users must interact, there is also no central location from which software component upgrades can be released. Therefore, users may need to contact several locations, including download "farms", to obtain the necessary software components. Further, there is no central authority to enforce licensing restrictions or payment terms that may be imposed by some software developers on the transfer, or use, of software components that they developed. In addition, software components that incorporate other software components may require that licenses be obtained from several vendors, thereby making the licensing process complicated.

Therefore, there is a need for a method and apparatus for downloading, authenticating and installing software program components over a network without user intervention.

There is a further need for a method and apparatus for downloading, authenticating and installing software program components that can operate while the user is actively using a program that incorporates such components.

There is also a need for a method and apparatus for downloading, authenticating and installing software program components from diverse locations.

Finally, there is a need for a method and apparatus that can automatically enforce licensing restrictions without requiring that a user collaborate with the central location.

SUMMARY OF THE INVENTION

In accordance with the principles of the invention, one embodiment of the invention uses a component manager that receives requests for component updates from a variety of sources, parses the requests and extracts URL information that identifies the location of a file containing the component resources. The component manager presents the URL to a download manager that asynchronously retrieves the component resources from the specified location and places the file in a staging area. Once the component resources have been downloaded, an install manager, also operating asynchronously from the component manager and the download manager, installs the component update.

In one embodiment of the invention, the component manager maintains a list of all components installed on the system so that requested components already installed on the system are not downloaded again.

In another embodiment of the invention, the component manager periodically polls component locations so that existing components can automatically be updated with new component versions.

In yet another embodiment of the invention, the component manager validates downloaded component resources before the component resources are installed in order to prevent security breaches.

In another embodiment, the component manager validates the root component in a component hierarchy and then extends a chain of trust from the root component to all other components in the hierarchy by processing each component.

In still another embodiment of the invention, the install manager can install components using built-in installation programs or installation programs that are also downloaded from external sites.

BRIEF DESCRIPTION OF THE DRAWINGS

The above and further advantages of the invention may be better understood by referring to the following description in conjunction with the accompanying drawings in which.

DETAILED DESCRIPTION

Figure 1:
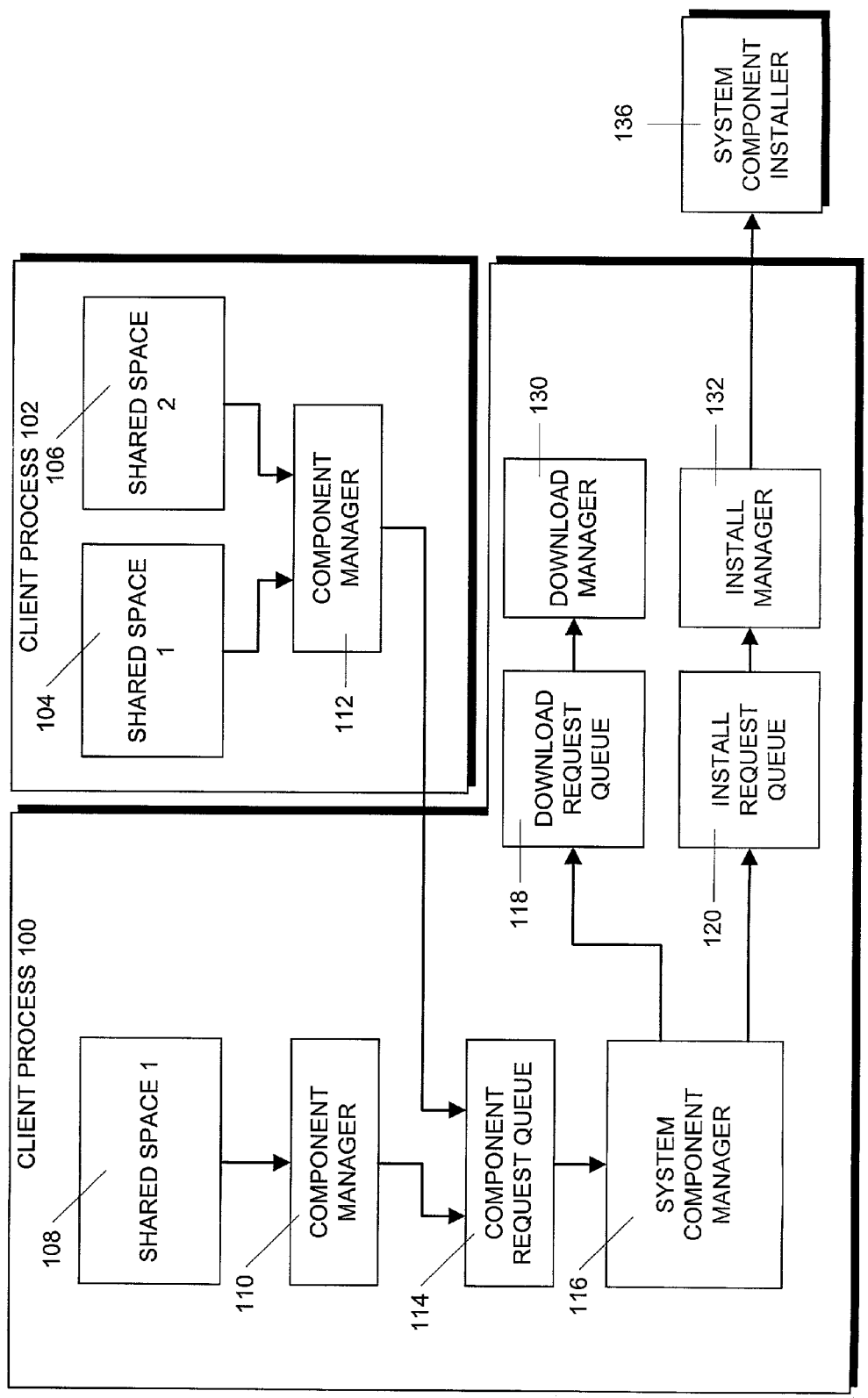
FIG. 1 is a block schematic diagram illustrating the main elements of the component manager, download manager and install manager.

The basic model used for component acquisitions and updates is a client server model in which the collaborative application acts as a client and retrieves software components from one or more servers. The client can connect to a component server over a network, such as a LAN or WAN, or the Internet. In the discussion below, the Internet will be assumed as the preferred network over which components are retrieved. FIG. 1 shows the architecture of a component manager system constructed in accordance with the principles of the invention. As described in the aforementioned patent application, Ser. No. 09/357,007, a collaborator may have several shared spaces active in his or her device at any given time. Each shared space may be controlled by a separate client process of which processes 100 and 102 are shown in FIG. 1. Other processes (not shown) may also be present. The device also has a single process, called a master process 100, that is responsible for the overall coordination of the system and the other process 102.

In client process 102, two shared spaces 104 and 106 are illustrated in FIG. 1, but more or less may actually be present. Similarly, although only a single shared space 108 is illustrated in client process 100, additional shared spaces may also be present.

Component manager objects 110 and 112 are responsible for managing the retrieval, management and launch of the collection of software components required by the local collaborative installation. Each process with which a collaborator operates has its own component manager instance. For example, shared spaces 104 and 106 have component manager instance 112 and shared space 108 has component manager instance 110. Other instances may also be present, but are not shown for clarity.

Each component manager object 110 and 112 receives "requests" for components and determines if, and when, the components need to be retrieved and installed on the local device. A request is a signal to the component manager that some entity needs a specific component to be available on the local device. These requests can arrive from remote client installations, be locally created by the instantiation of a tool template, or be generated by the component manager itself as a result of polling for newer versions of already installed components.

A special single component manager instance, called a system component manager 116, operates in the master process 100 and is forwarded all component update requests from all other component managers 110 and 112, via the component request queue 114. A local component manager, such as component manager 110 or 112, can determine if a component update request will result in a component download, but only the system component manager 116 actually performs downloads and installations. The system component manager 116 also handles tasks, such as polling for new versions of installed components on time-driven events associated with the installed components (for example, components can "expire" as discussed below). The system component manager 116 also coordinates the shutdown of certain processes that normally run continuously.

The system component managers 116 works in conjunction with a download manager 130 and an install manager 132. The download manager 130 retrieves components designated by the system component manager 116 from a server over a network, such as the Internet, and the install manager 132 installs retrieved components in the local system. The system component manager 116 communicates with the download manager 130 via the download request queue 118, and communicates with the install manager 132 via the install request queue 120.

The download manager part 130 of the master process 100 is responsible for servicing requests to retrieve software components from the Internet. As discussed below, each component is identified by a Uniform Resource Locator (URL) that is passed to the download manager 130 by the system component manager 116 to begin the download process. The download manager 130 works with the network transport layer of a network protocol stack in order to retrieve components without interfering with the normal transfer of information between collaborators, via deltas. The system component manager 116 and the download manager 130 communicate by exchanging information via the download request queue 118 which can be an element queue as described in aforementioned application, Ser. No. 09/588,195.

The install manager 132 is the part of the master process 100 responsible for servicing requests to install components once the components have been downloaded. Because installations must be serialized and since multiple component managers can be working independently, the install manager 132 exists in the master process 100 in order to coordinate installation requests. As with the download manager 130, the system component manager 116 and the install manager 132 communicate through a queue 120 that can be an element queue. Component managers 110 and 112 also implement factories which instantiate components in order to satisfy activation requests for components employed by a given shared space.

A system component installer 136 handles installation components which cannot be installed while any other collaborative process is active. These components are often system components which comprise the collaborative platform but they can also be tools which are currently in use. The former components could include, for example, a storage manager, a communications manager, and the component manager, download manager and install manager themselves. Also included are any components that are essential to the collaborative system and for which on-demand loading would be difficult. These former components might include a dynamics manager, member manager or activity manager. The system component installer 136 does not rely on any other software so that it can upgrade system components when the rest of the collaborative system is unloaded. During operation, the system component installer 136 is launched by the install manager 132. When it has finished running, the system component installer 136 launches the normally running portion of the collaborative system.

Figure 2:
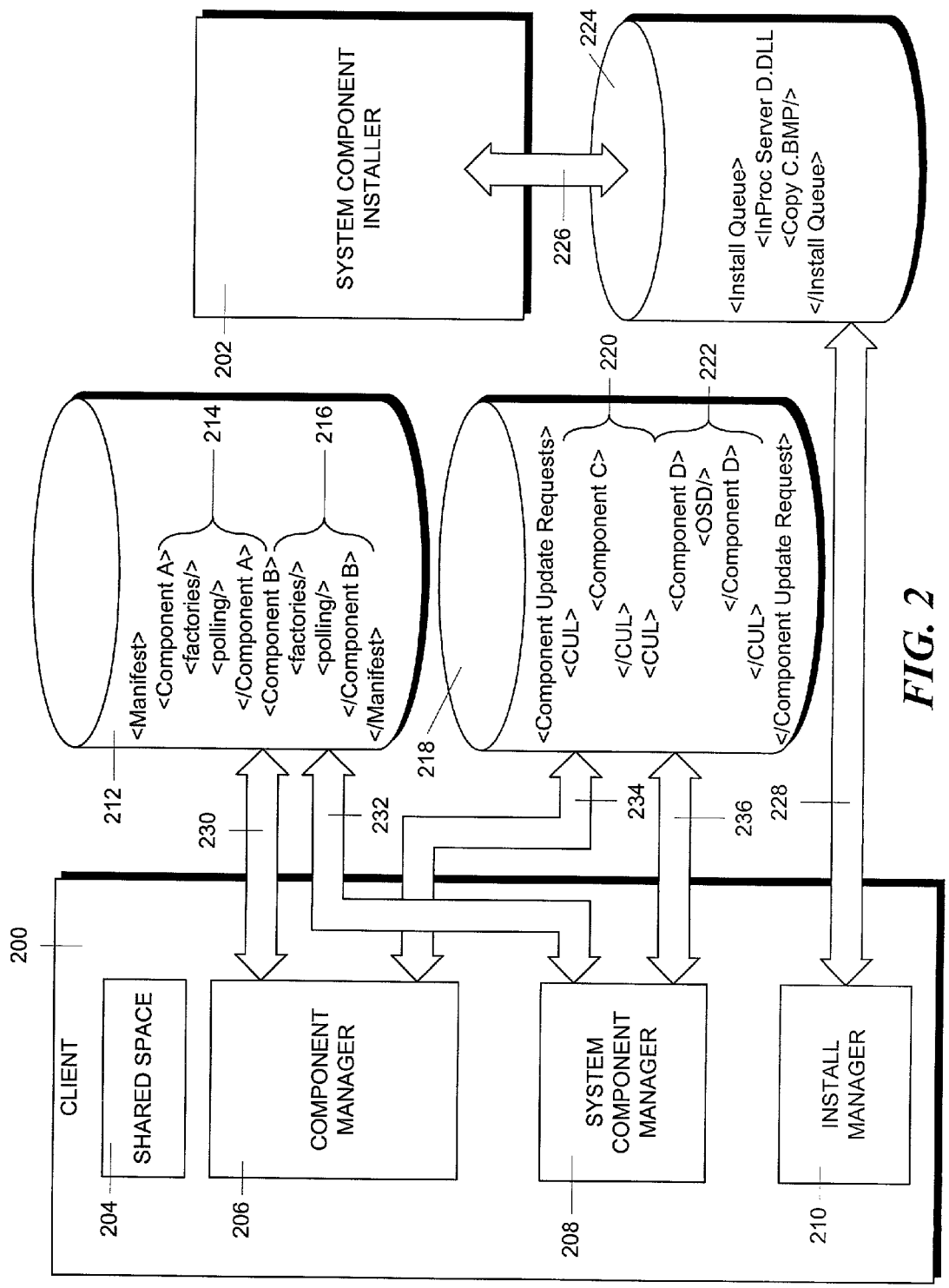
FIG. 2 is a block schematic diagram of a client process and a master process illustrating the type and content of data persisted by the processes.

The system component manager 116 and the system component installer 136 maintain persistent data that relates to the components to be installed and to the components already installed. FIG. 2 illustrates this persistent data. In particular, FIG. 2 illustrates a master process 200 and a system component installer 202. The master process 200 includes a shared space 204, a component manager 206, a system component manager 208 and an install manager 210.

Both the component manager 206 and the system component manager 208 consult the manifest, which is a persistent XML document maintained in storage 212. The component manager 206 inspects the manifest, as indicated by arrow 230, when the component manager 206 receives a component request, for example from shared space 204, to determine if the component is already installed on the current device. Component manager 206 also consults the manifest if it is called to instantiate a component. For example, if shared space 204 required components A and B, the component manager 206 could determine from the manifest that both component A 214 and component B 216 were already installed. Furthermore component manager 206 could instantiate these components if requested to do so.

The system component manager 208 also consults the manifest in storage 212, as indicated by arrow 232, to determine when to poll for new versions of components or when to deem components to be expired. When a new component is added to the device, the system component manager 208 is responsible for updating the manifest.

When a component manager 206 receives a request for a component which is not installed, it creates a component update list (CUL) in an "in progress" component update requests document in storage 218 as schematically indicated by arrow 234. The system component manager 208 processes component update requests in the in progress document 218, as schematically indicated by arrow 236, and periodically updates the document with the progress of each component update request. In FIG. 2, there are two requests in progress, Component C 220 which has just been added and Component D 222 for which the system component manager 208 has used the download manager (not shown in FIG. 2) to retrieve the component OSD file.

Components often express dependencies on other components so that a CUL usually begins with a single component URL and then grows into a tree of component descriptions. An error during the downloading, verification or installation of any of these components requires that the downloading, verification and installation of the entire tree of components be aborted without causing major problems.

A separate file called a system component install queue is used to communicate between the system component installer 202 as indicated by arrow 226 and the install manager 210 as indicated by arrow 228. The system component install queue file is typically stored in a storage area 224 that is associated with the master process 200. The file contains a list of components that the system component installer 202 must install and the results of the installation process for each component once the system component installer 202 has attempted the installations. This list contains all the components which have been, or will be, installed as part of processing the current CUL. In the case of failure during the installation of some component, this list is used to roll back any installations associated with the CUL. The list can be XML based as illustrated in FIG. 2.

Figure 3:
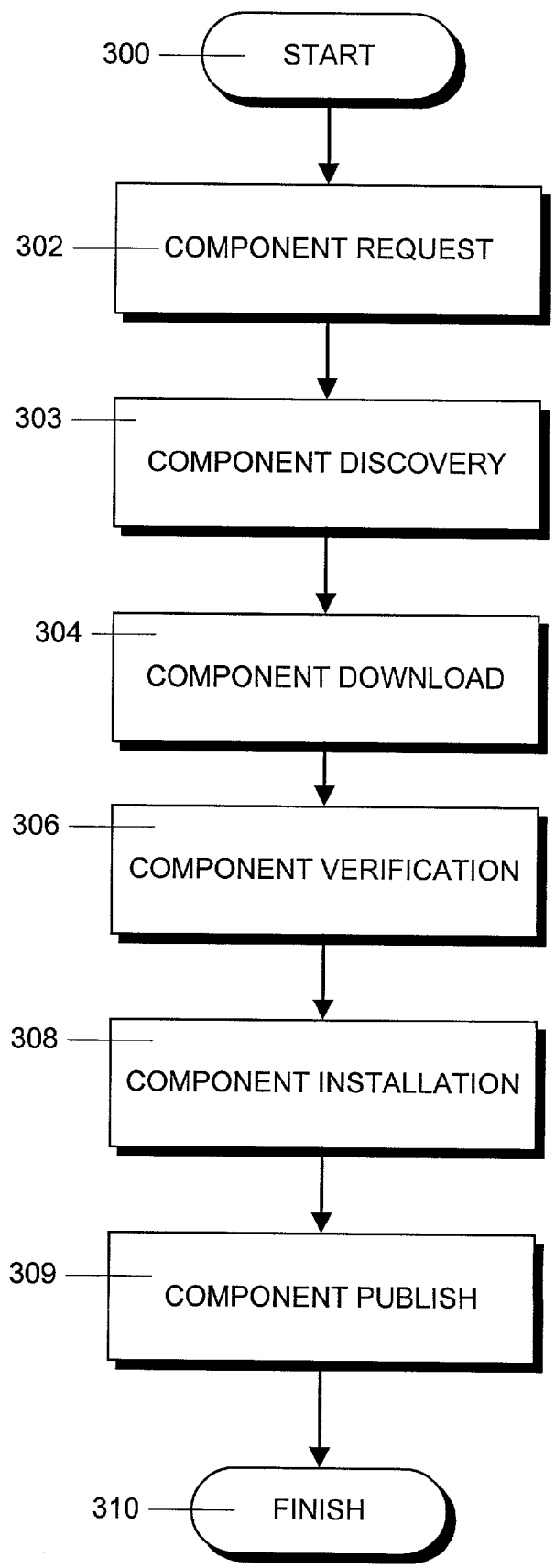
FIG. 3 is a flowchart illustrating the steps in an illustrative component update process.

The process that occurs once a request for a new or updated component has been received by the system component manager is called a component update. An overview of the process is shown in FIG. 3. The process commences in step 300 and proceeds to step 302. There are six phases to the component update process: component request 302, component discovery 303, component download 304, component verification 306, component installation 308 and component publish 309. The process then finishes in step 310.

The first four phases, 302, 303, 304 of a component update occur in an asynchronous fashion and sometimes only when the system has idle periods. They generally do not involve user intervention. The verification step 306 and the installation step 308 can require some user input and parts of the collaborative system may depend on its completion. For example, the user may be asked to trust the component developer or to answer some prompts generated by an install program.

The first phase of a component update involves the system component manager 116 being alerted that a component needs an update. The system component manager 116 both polls for, and is asynchronously notified of, the need to update components. In the case of asynchronous notification, the component manager either receives a "component update delta" or an XML-RPC message that causes the component manager to initiate a download. In the case of polling, the component manager uses attributes of a locally-installed component to determine how often to check for a newer version. Thus, polling only applies to already installed components while notifications can apply to new or already installed components.

More particularly, there are at least four ways to trigger the update process. These include a user generated update request in which a user (or process) generates a request by performing one of several actions. For example, a user could start the collaborative system for the first time, the user could add a new or updated tool to a shared space or the user could invite a new user to join a shared space. In the case of a user generated update request, a local component update delta is generated and then dispatched to other shared space members. When a new user is invited to join a shared space, the new member receives a copy of the shared space which incorporates a list of required components. These are both examples of a synchronous notification.

The second way to trigger an update process is by polling. Frequently, the system component manager 116 will inspect its local manifest of installed components to see if any component has reached an update "time" that is defined by the component provider. In addition, the system component manager 116 can cause a download of a component file from the location from which the component was originally retrieved and check to determine whether the component file references a newer component. If so, the system component manager 116 will cause the newer component to be downloaded as well.

The third way to initiate an update process is for a user to "inject" a component by executing a specific program file type. This file type can be interpreted by the collaborative system and, if the contents of the file specify a component request, the contents will be routed to the system component manager 116 which will begin a component update, if necessary.

The fourth way to trigger the update process is by an external agent. In rare cases, there may be a need to "alert" the system component manager 116 that it needs to get a component immediately (for example, a component was found to have a security problem, but the update age had not been reached). In this case an "alert bulletin" could be registered with a server that polls frequently for various types of bulletins. This server could then download the alert and send it to the system component manager 116.

Component resources are any files that are downloaded, installed, and managed by the component manager and are described in a language called an "open software description" or OSD. This language is contained in a proposal before the World Wide Web Consortium to describe the components of a software package in XML using predefined tags. Component resources are defined within an OSD file by using a <SOFTPKG> tag. A hierarchy of component resources can be defined using the <DEPENDENCY> tag in which another <SOFTPKG> tag is nested. A <SOFTPKG> block in an OSD file instructs the component manager to manage these OSD files. The details of the OSD language can be found on the World Wide Web Consortium web site http://www.w3.org/TR/NOTE-OSD.html and are incorporated by reference herein.

In the inventive system, the basic OSD language is used with extensions to describe software components and an OSD description can refer to other OSD descriptions. Although component resources are defined as nothing more than files, they often are, or contain, components. As discussed below, version compatibility and COM requirements apply to component resources that are, or contain, components. These requirements do not apply for other types of component resources, such as WAVs or GIFs.

Generally, components defined in a template do not correlate one-to-one with component resources as defined in an OSD file. However, there are two common ways they are related. In the first way, many components, such as COM objects, are related to one component resource, such as a DLL file. In particular, many COM objects that are individually listed in a template can be put into a single DLL file. For example, a DocumentShareTool.DLL could contain DocumentShareView, DocumentShareEngine, DocumentShare-Code, DocShareReplaceFileCode, DocSharePropertiesCode, and DocShareCreateLinkWizardCode objects. In the DocumentShareTool template, all of these objects are defined in their own <Component> tagged block. Each of these tagged blocks then contains a similar component resource URL because all of these components need to point to the same component resource—the DocumentShareTool.DLL file. However, they often include a unique factory which maps to an instantiatable object within the DLL.

Another example is a Games.DLL component resource that contains Chess and Tic-Tac-Toe objects. In this example, there are more components in the component resource than are required by a single tool. Adding the Chess tool to a shared space has the side effect of installing the component resources needed for the Tic-Tac-Toe tool. This is because the Games.DLL is a dependency for both the Chess Tool and the Tic-Tac-Toe tool.

The other common scenario is a single <Component> tagged block in a template which points to an OSD file that defines multiple component resources. For example, the component may be included in a DLL file, which relies on other support files like a utility DLL file, some GIF files, and a WAV file. These ancillary component resources in the OSD file may be defined individually so that they can be individually managed by a component manager. For example, assume that one of the dependencies of a COM object specified in a tool is a DLL file which contains functions used by other COM objects that are not part of the tool. By making the component manager aware of the DLL file, the installation and download of the other COM objects could be expedited.

A component update request that a component manager receives asks for a component resource by providing a URL that identifies the resource to the component manager. Component resource URLs always point to the Internet, via an HTTP or an FTP scheme. The format of a component resource URL has two parts separated by a "?" character. The following is a simple example:

ftp://components.groove.net/
Games.osd?Package=net.groove.Chess&Version=2

The first URL part that consists of text to the left of the "?" character specifies an OSD file. The OSD file can be self-contained or it can reference, recursively, other OSD files. The second part of the URL, the text to the right of the "?", provides a query that the component manager uses to evaluate the OSD file(s). Within the query portion of a component resource URL there is a token "Package" followed by an operator "=", in turn, followed by a string value which is the name of a "package." A package logically defines the set of functionality that makes a component resource unique. Consequently, although a package can have multiple implementations, the functionality of the package is designed to be roughly constant. Package names must be unique for all component resources and are used by a component manager to determine whether a component with the required functionality is installed in the shared space. To accomplish this, the package name can be hierarchical or can be a guaranteed universal identifier. In the above example, the package "net.groove.Chess" represents a chess tool.

The OSD description for a component resource contains information defining the component resource version. A component resource version is loosely defined in the OSD language as a string containing four, comma-separated, version values: Major, Minor, Custom, and Sequence. A major version value defines specific features that differ among the other major versions of a package. These features must be additive such that a later major version will support all the features in an earlier major feature (that is, major versions are backward compatible). A later major version is required to understand any persistent data written by an earlier version. Two major versions are not expected to be able to communicate with each other either (that is, exchange deltas). Different major versions must have different COM class identifiers (CLSIDs) and, as such, can coexist on the same device. This allows a single shared space, for example, to be using two different major versions of a tool (separate tabs) which are logically the same tool.

Because major versions define feature sets and compatibility for a package, a client requesting a component resource will often specify a major version as part of the query in the component resource URL. In the example, URL set forth above, the query requests a component resource with a major version equal to version 2.

Minor, Custom and Sequence values all have the same basic semantics—new minor, custom, and sequence number versions within the same major version are required to be forward, and backward, compatible. They need to work with persistent data created by, and to communicate with, any other versions of the same major version. Only one instance of a major version can be installed at a time on a given device so a change in any of these three version values cannot change the CLSID.

For simplicity, the discussion below will use the term "minor version" to mean any of these three version type values. The purpose of these version types is to fix bugs and not to introduce features, and there are few reasons why a tool/template developer would specify a minor version in a component resource URL. However, if such a minor version is specified, the minor version is always interpreted as the specified version or a later version.

Figure 4:
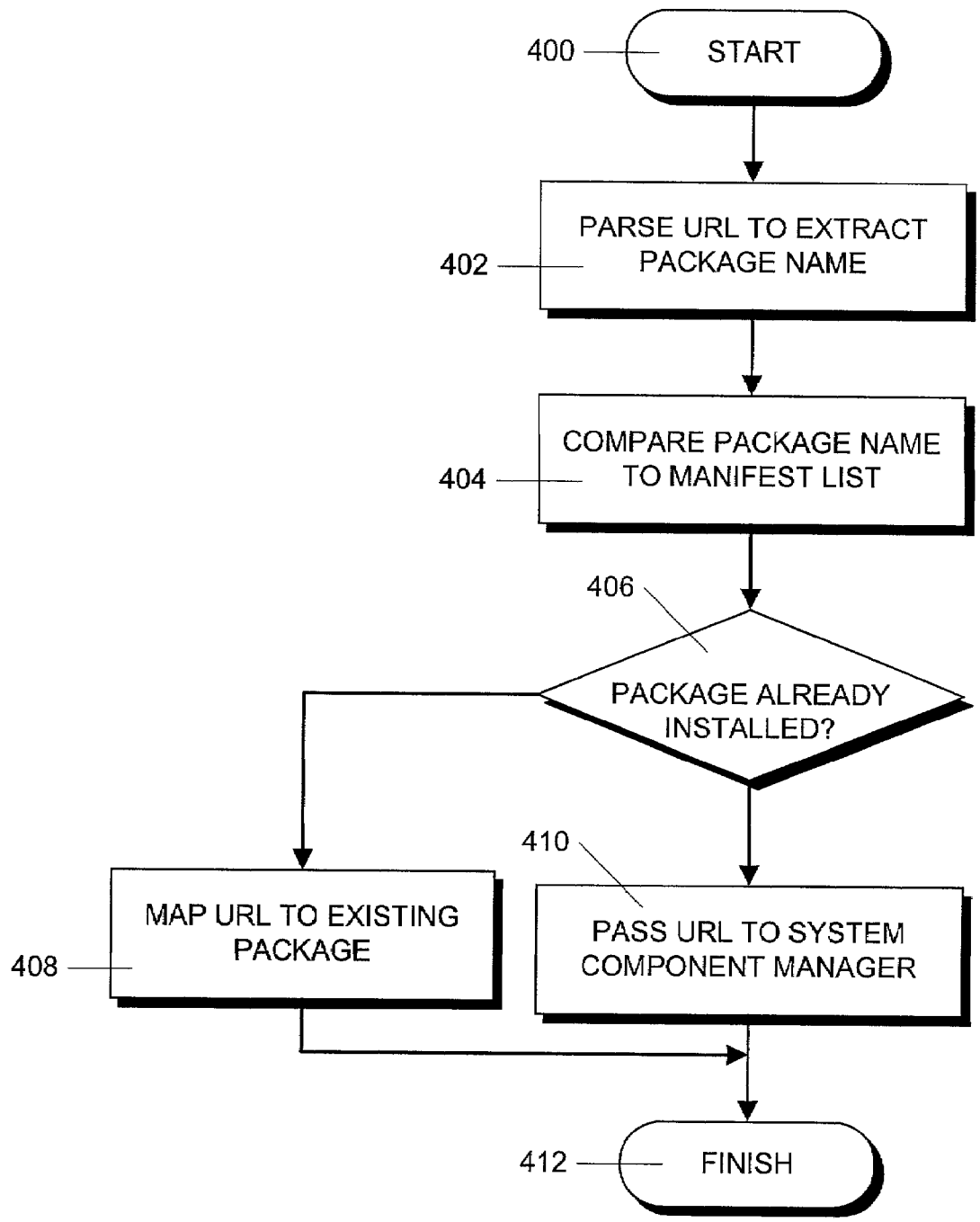
FIG. 4 is a flowchart illustrating the steps in an illustrative process in which the component manager generates a component request to the download manager.

The request step is illustrated in more detail in FIG. 4. The process begins in step 400 and proceeds to step 402 where the URL in the request is parsed to extract the package name. In step 404, the package name is compared to the list of package names on the manifest. Based on this comparison, in step 406, a decision is made whether the package must be downloaded. In many instances, a component update request does not result in a component download because a suitable version of the component is already installed on the local device. For example, assume the component resource specified by the example URL set forth above was already installed, and a subsequent request was received with the following URL:

http://www.tucows.com/Components/Groove/ Games.osd?Package=net.groove.Chess

Even through this subsequent URL points to a different OSD file, the component manager would not have to process the OSD file because it already has the net.groove.Chess package. The capability of recognizing a package by its name allows tool/template developers to mirror OSD and component resources. Note that, in order to make the query work, the name used for the package must match the NAME attribute of the <SOFTPKG> tag of the OSD file referenced by the URL.

Not every component resource that is defined in OSD needs to be in a separate downloadable file. For example, say that a component resource, A.DLL, depends on ancillary component resources bundled in a single CAB file. In this case, the <CODEBASE> tag, which specifies the downloadable file, would only be present in one of the component resources. This allows a component manager to manage the individual component resources that are in a CAB file.

If, as decided in step 406, a suitable component has already been installed, then, in step 408, the URL provided with the request is mapped to the existing component. Alternatively, if, in step 406 it is determined that a suitable component is not installed, then the URL is passed to the system component manager to obtain the component.

In the second phase of the component update process— component discovery 303—the system component manager downloads and parses the OSD file specified by the component resource URL. The goal of the component discovery is to find the <SOFTPKG> element that describes the component named in the query. There is no guarantee that the correct <SOFTPKG> element will reside in the OSD file specified by the URL. It is possible to "redirect" the system component manager to a new OSD file with the following syntax:

```
<SOFTPKG NAME="net.groove" VERSION = "0,0,0,0"
    Lg:Redirect HRef=http://components.groove.net/Groove.osd/>
</SOFTPKG>
```

This feature is extremely useful because it allows component developers to re-organize their OSD without invalidating published component resource URLs.

Once the required <SOFTPKG> element is found, the system component manager determines if the component has any dependencies which are not installed on this device (that is, not listed in the manifest). If so, the same process of discovery is recursively applied to this dependency. In this fashion, the system component manager constructs a tree of <SOFTPKG> elements that need to be downloaded and installed.

During the component discovery phase, the system component manager also may apply "device policies". A given set of collaborative system devices can be specified to exist within a management domain that is managed by an administrator. The administrator of this management domain can specify "device policies" that allow or prevent the download and installation of components on the managed devices. These device policies are installed on each client in the management domain using an XML-RPC method.

In the component discovery stage, the system component manager inspects the current device policies to determine if they are applicable to the present component update. Explicit permission to install a given component can be specified in a device policy and will cause the system component manager to omit asking for the user's permission. Explicit prohibition to install a component can also be specified in a device policy and will cause the system component manager to abort the component update.

The third phase of a component update 304 (FIG. 3) involves the download manager, having been called by a component manager, retrieving the component identified by the OSD file and placing the retrieved component in a staging area. The download operation is asynchronous with the operation of the system component manager and the remainder of the system. First, the download manager determines whether the component has already been downloaded. There are many situations where the system component manager issues a download request and then terminates. Since the download is asynchronous, downloading will continue to completion even in the absence of the system component manager. However, the download manager cannot notify the system component manager that the download is complete because the system component manager does not exist. When that system component manager restarts, it will re-issue the download request at which point the download manager can inform the system component manager that the component has already been downloaded.

The download manager operates with a "transport layer" layer to perform the actual download operation. The transport layer provides an interface to download a file based on a URL. In general, the download manager can initiate more download requests than the transport layer will allow, in order to prevent interference with the collaborative system. Therefore, the download manager can expect the transport layer to slow those requests as needed.

In a preferred embodiment, the download operation will be capable of stopping when a file is partially downloaded and then restarting without starting the download at the beginning of the file. Thus, the transport interface must take a file offset from which to restart. On initial download the offset will be zero. The transport layer writes the file to a stream object as the file is downloaded. The transport interface may also take flags to specify certain download requirements. For example, a priority flag may be specified to help the transport layer determine how aggressive the operation should be. In order to retrieve the file, the transport layer will try different protocols in some order based on efficiency.

After calling the transport interface, the download manager thread reads from the stream pending, if necessary and writes the stream data to a file in the download manager staging area. The name of the file is determined by the components OSD name and the staging area is partitioned by the URL path. The download manager also notifies the system component manager of its progress, via an element queue, if requested. Finally, when the download manager thread receives an end-of-stream return code, it closes the staging file and notifies the system component manager that the file transfer, but not the file verification, is complete. In a preferred embodiment, components can be downloaded from "component farms", which are commodity servers that host components available for download by the component manager.

The component discovery phase employs the download manager to download OSD files in the same fashion that the download phase employs it to download components. However, the user rarely perceives the download of OSD files, as they may perceive the download of components, because the OSD files are generally much smaller.

The fourth phase of a component update 306 involves the system component manager authenticating the integrity of the file just downloaded. Component authentication is performed by the system component manager after a component has been downloaded, but before the system component manager installs the component. Although each component is individually authenticated, there is a chain of trust that extends from a root component through each child component in the component hierarchy.

Figure 5:
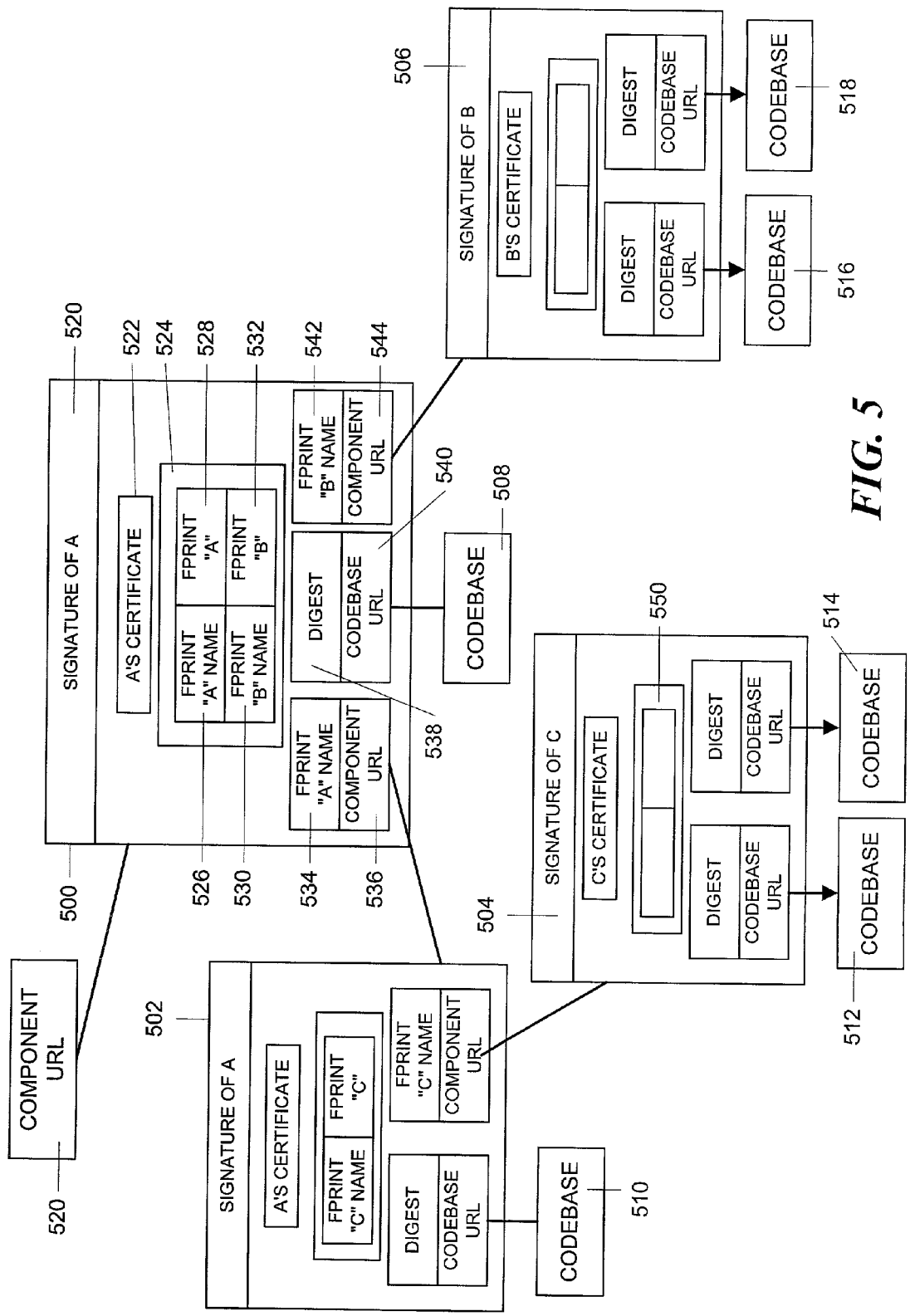
FIG. 5 is a block schematic diagram illustrating security elements used in validating and verifying a downloaded component.

FIG. 5 illustrates a hypothetical component hierarchy. In this diagram, there are four OSD files 500, 502, 504 and 506. OSD file 500 is associated with component 508 that is to be installed. Similarly, OSD file 502 is associated with component 510 and OSD files 504 and 506 are associated with components 512, 514 and 516, 518, respectively. Each OSD file contains the component security data elements that are needed for the set of components in the OSD file. For simplicity, the OSD data elements (for example, SOFTPKG, DEPENDENCY) that would be required by this hierarchy have been omitted.

There are five types of security data elements possible in any given OSD file, for example, OSD file 500. These include a single signature (certificate and encrypted digest) 520 used to authenticate the contents of the OSD file 500. A single certificate 522 used to validate the signer is included. Also present is a fingerprint table 524 that contains one fingerprint for each unique signer of OSD files referenced by the current OSD file 500. A fingerprint is the digest of a certificate. In OSD file 500, each entry in the fingerprint table 524 contains a simple name for the fingerprint, for example, name 526, as well as the corresponding fingerprint itself 528. Similarly, name 530 is associated with key 532.

Secure component URLs may also be included. A secure component URL is the pairing of a normal component URL (such as URLs 536 and 544) and a simple name (534, 542) that maps to a fingerprint table entry. In other words, a secure component URL is a component URL and a fingerprint. The fingerprint table 524 is merely a convenience to save space in the OSD file. Secure codebase URLs can also be included. A secure codebase URL is the pairing of a normal codebase URL 540 and a digest 538 of the component 508 that is referenced by the codebase URL 540.

These security data elements are used to guarantee the authenticity of the components in two distinct ways. First, the signature 520 on the OSD file 500 and the digest 538 of the codebase 508 are used to guarantee that the contents of the OSD file 500 and the codebase 508 exactly match their contents at the time they were signed. The reason this is important is because both OSD file 500 and codebase 508 may be downloaded off a public network, such as the Internet, and are susceptible to alteration (both at the site where they are stored or via spoofing). The component manager can verify the signature and the digest in a conventional manner in order to guarantee that these entities have not been altered.

Secondly, the public keys 534, 542 contained in the secure component URLs is used to guarantee that the organization, or individual, ("B") that signed an OSD file, such as OSD file 506 is the same organization, or individual, that the signer of a referring OSD file 500 thinks signed the file 506. This is a very different type of authenticity than in the first case. The public key 532 cannot provide any information about the contents of the OSD file 506 to which it refers so the contents may be very different between the time when the referring OSD file 500 was signed (by "A") and the time that a component manager attempts to authenticate the OSD file 506. Therefore, it is the signer ("B") who is trusted rather than the contents of the secondary OSD file 506 and the authentication relies on a chain of trust.

In the specific hierarchy shown in FIG. 5 the root OSD file 500 is signed 520 by organization "A" and contains a single component 508 which depends on two other components 510 and 516. The first 510 of those components is in an OSD file 502 signed by "A" and the second component 516 is in an OSD file 506 signed by "B". In turn, OSD file 502 contains a single component 510 which depends on two other components 512 and 514 which are contained in an OSD file 504 signed by "C". OSD file 504 contains two components 512, 514 with no dependencies on other components. Thus, the public key table 550 is empty. Similarly, OSD file 506 is signed by "B" and again contains two components 516 and 518 with no dependencies.

In accordance with a preferred embodiment, component authentication is accomplished by establishing the chain of trust from the root component 508 downward through the hierarchy. To accomplish this, the component manager treats the root component 508 in special manner that allows it to assert the initial trust relationship. Once that trust is established the component manager can use the security data elements described above to extend the trust down the component hierarchy.

Figure 6:
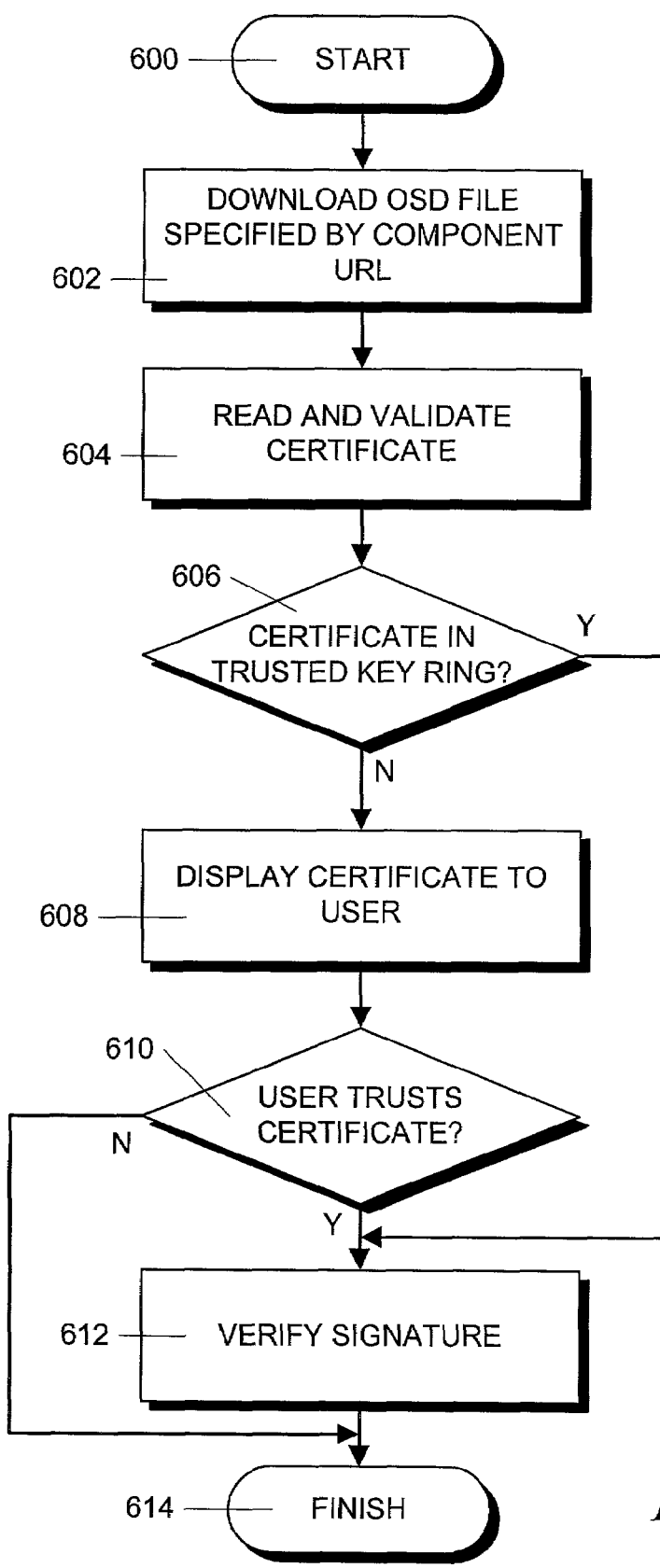
FIG. 6 is a flowchart showing steps in an illustrative process for establishing an initial chain of trust for a downloaded root OSD file.

Every component update requests begins when some object calls the component with a component URL. This first component URL 560 is identical in format to the component URLs (for example, URLs 536 and 544) that point from one OSD file to another. However, component URL 560 is special because it specifies the root of the component hierarchy from which the chain of trust will be established. It is also special in that it is not a secure component URL. The steps for establishing this initial trust are illustrated in FIG. 6. The process begins in step 600 and proceeds to step 602 in which a component manager, having determined that the component specified by the initial component URL needs to be installed, uses the download manager to download the OSD file 500 specified in that URL 560.

Next, in step 604, the component manager extracts the certificate 522 from the downloaded OSD file 500 and either validates the certificate itself or provides the certificate to another process, such as a security manager, for validation. Validation entails checking the certificate information for correctness and validity (for example, expiration dates).

In step 606, the process determines if the extracted and validated certificate is in the user's trusted key ring. If it is, then the signer can be trusted and the process proceeds to step 612. If it is not, then the certificate information is displayed to the user in step 608 and the user is asked if they trust the signer in step 610. If the user does not trust the certificate then the process finishes in step 614. Alternatively, if the user does trust the certificate, the process proceeds to step 612.

Once the certificate is validated, in step 612, the component manager verifies the signature 520. To do this, the component manager first removes the signature 520 from the OSD file 500 because the signed data set does not include the signature 520. The component manager then computes the digest of the modified OSD file 500 and verifies the signature 520 using this digest and the public key in the certificate 522.

Assuming all goes well the process finishes in step 614 and it has been established that the root OSD file 500 is byte-for-byte the same as it was when it was signed and that the user trusts the person that signed it. The OSD file 500 can now be parsed.

Figure 7:
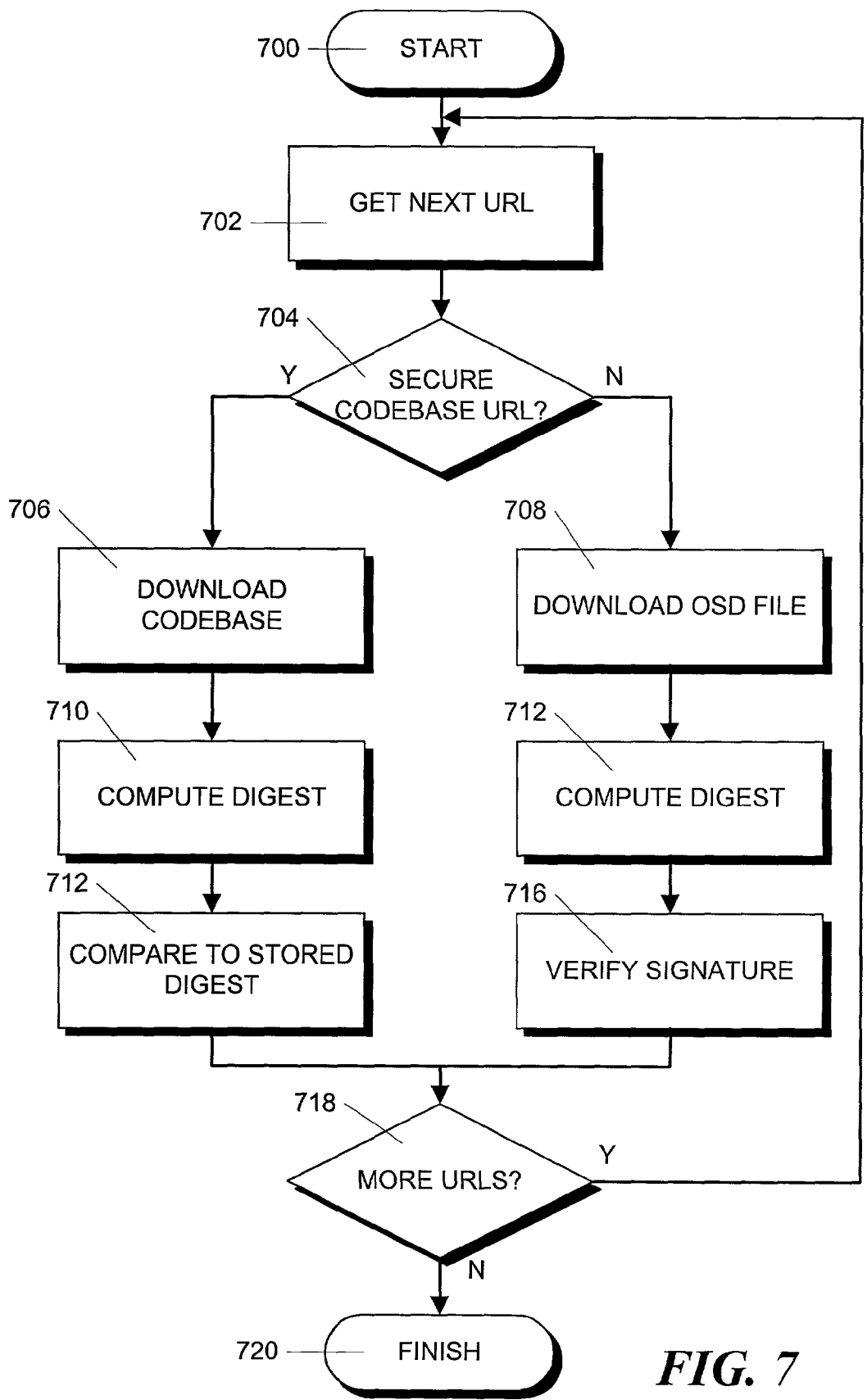
FIG. 7 is a flowchart showing steps in an illustrative process for extending the trust relationship from the root OSD file to any remaining components by resolving each component URL.

The previous steps described the special handling the component manager applies to the root OSD file 500 to assert the initial trust relationship. FIG. 7 illustrates the steps in a process that the component manager uses to extend that trust relationship to the remaining components by resolving each component URL. These steps are applied recursively from the root component through all child components. This process starts in step 700 and proceeds to step 702 where the next secure URL in the chain is retrieved. In step 704, a decision is made whether the secure URL refers to a component codebase or to another OSD file.

If the URL refers to a secure codebase, then, in step 706, the codebase is downloaded. In step 710, the digest of the codebase is computed and in step 714, the computed digest is compared to the stored digest.

Alternatively, if the URL refers to another OSD file, then, in step 708 the OSD file is downloaded. In step 712, the digest is computed (minus the signature). Next, in step 716, the signature is verified using the public key from the referring OSD file and the just computed digest. Using the public key from the referring OSD file is important because this key guarantees that the signer of the secondary OSD file is who the signer of the referring OSD file thinks it should be. Simply using the public key from the certificate of the secondary file would not provide the same referential integrity.

In the case of either type of URL, the process proceeds to step 718 where a determination is made whether additional URLs remain to be processed. If so, the process proceeds back to step 702 whether the next URL is retrieved. If not, the process finishes in step 720.

Most of the time when a component manager is requested to resolve a component URL, the component in question has already been installed so that the component manager does not need to download the component. However, with secure component URLs, the component manager can also make sure that any previously-installed component was signed by the same organization by which the current secure component URL claims it has been signed. To support this feature, a component manager can store in every component entry in the manifest, the fingerprint of the signer of that component. Then, when a component manager checks to see if a component is already installed, it can also compare the manifest fingerprint against the secure component URL fingerprint.

When fingerprints are included in the manifest, it could be the target of an attack to compromise component security. To prevent this the manifest can be message authentication coded with a secret key which is unique (generated) for each client. Whenever the manifest is altered, it must be coded. However right before being altered, the previous message authentication code is re-verified to ensure that the only change going into the manifest is the one being added in this operation. In general, semaphores or some other mechanism can be used to guarantee that the re-verify, apply change, and recoding operation is atomic.

When the collaboration system is first installed, a pre-seeded manifest is also installed, which reflects the components that are part of the installation kit. Since the secret key with which the manifest is signed is generated on the client, the manifest in the installation kit cannot be coded. Instead, it can be signed. Accordingly, when a component manager first accesses the manifest it will discover that the manifest is signed (rather than message authentication coded) and will generate a unique secret key, and then message authentication code the manifest.

If the authentication of an OSD file or codebase fails during any point of aforementioned process, the component update is halted and the update subscriber is notified.

Component signing is the process by which the various component security data elements described above are applied to OSD files. In one embodiment, a component signing utility works on a single OSD file at a time. Although the utility may be called with a set of OSD files, the utility will behave as if it were called separately for each OSD file. Because the OSD files are processed individually, the order of the signing is insignificant. The following is an illustrative signing algorithm. Other algorithms would be apparent to those skilled in the art.

Referring to FIG. 5, in order to simplify the utility implementation, there is a clear division between security data elements constructed by the OSD file author and elements generated by the signing utility. Specifically, with respect to OSD file 500, the URLs 536, 544, the public key names 534 and 542 and the public key table 524 and its contents are data elements that are provided by the OSD author. The digests 538, certificate 522, and signature 520 are added by the signing utility.

Figure 8A:
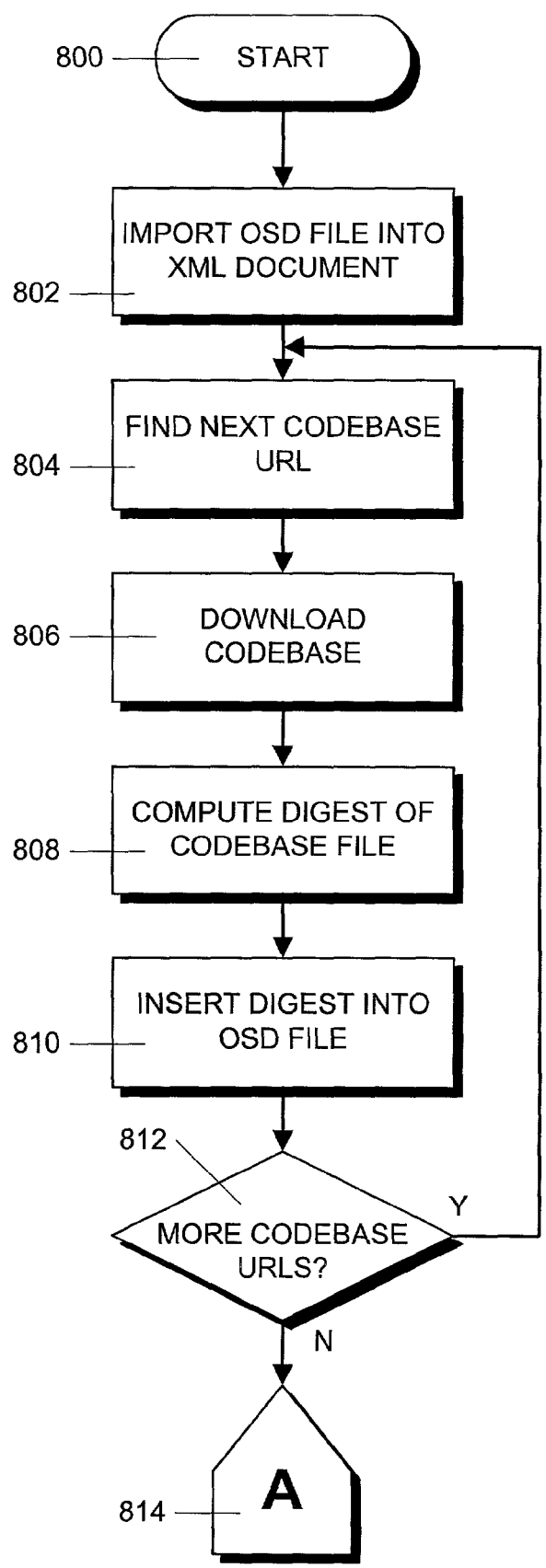
FIGS. 8A, 8B and 8C, when placed together, form a flowchart showing steps in an illustrative process for signing each OSD file.
Figure 8B:
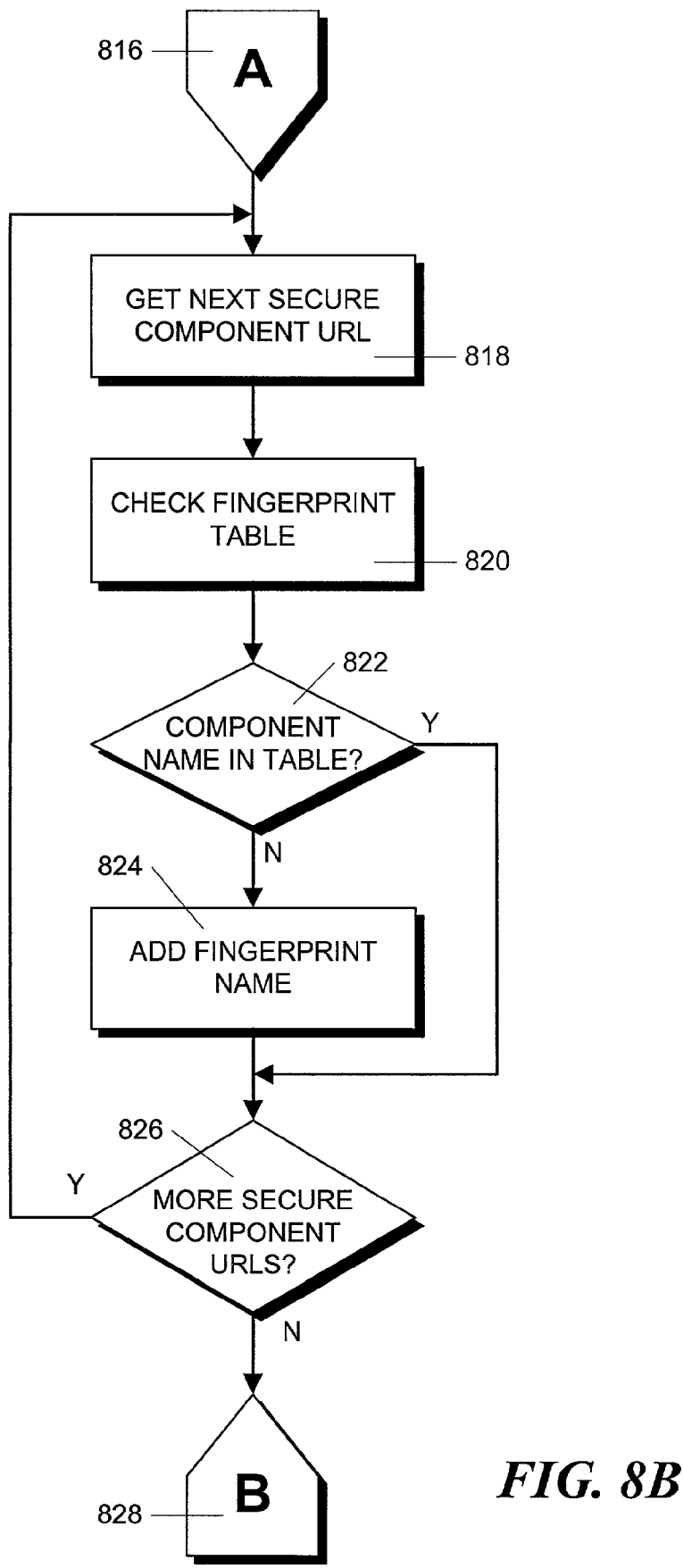
Figure 8C:
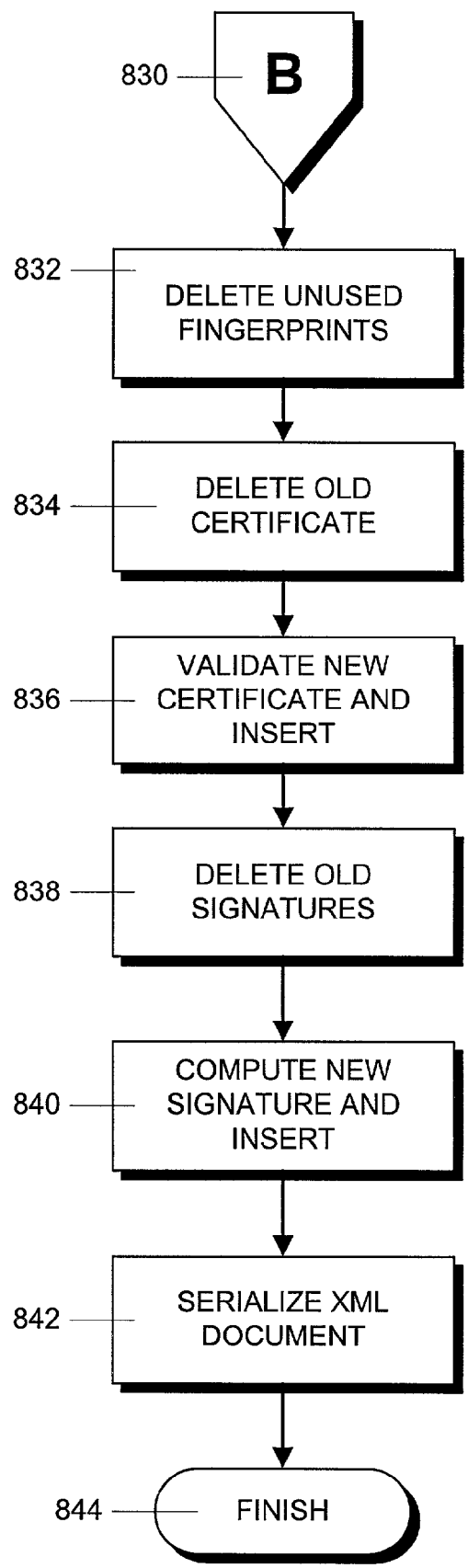

With this division, the signing utility will take as arguments one or more OSD files; an output directory name, the signer's certificate file name and the signer's private key file name. FIGS. 8A-8C, when placed together, form a flowchart that shows the steps in the illustrative process that the component signer can use for each OSD file provided. This process starts in step 800 and proceeds to step 802 in which the OSD file is imported into an XML document. In step 804, a conventional locator subroutine is used to find the next codebase URL in the XML document.

In step 806, the codebase specified by the located URL is downloaded. Next, in step 808, the digest of the codebase file is computed. Then, in step 810, the computed digest is inserted into the OSD file, making the codebase URL into a secure codebase URL. A check is made in step 812 to determine whether any more codebase URLs exist in the document. If there are more codebase URLs, then the process proceeds back to step 804 to process the codebase URLs. If there are no more codebase URLs as determined in step 812, the process proceeds, via off-page connectors 814 and 816, to step 818.

In step 818, the locator is used to find the next secure component URL in the XML document. In step 820, the public key table is checked to make sure that it contains the public key name of the secure component URL. If, as decided in step 822, the public key table does not contain the fingerprint name, the fingerprint name is added in step 824 and the process proceeds to step 826. Otherwise, the process proceeds directly to step 826.

In step 826, a determination is mode whether additional secure component URLs exist in the XML document. If so, the process proceeds back to step 818 so that each secure component URL is processed. Otherwise the process proceeds, via off-page connectors 828 and 830, to step 832.

Next, in step 832, any unused fingerprints are deleted from the public key table. Similarly, in step 834, if a certificate exists in the XML document, it is also deleted. Next, in step 836, the new certificate, provided as an argument, is optionally validated and inserted into the XML document. In step 838, any previous signatures are deleted. In step 840, a new signature is computed and inserted into the XML document. Finally, in step 842, the XML document is serialized to the same file name in the output directory and the process finishes in step 844.

The fourth phase (310, FIG. 3) of component update involves a component manager calling an install manager (132, FIG. 1) to execute an installation program specified in the OSD file of the downloaded component. For example, within a <SOFTPKG> block of the OSD file, a component developer can specify how to install the component resource using an <Install> tag. The installation phase is usually triggered by a user action such as the opening a shared space with an old component.

The installation program may be one of a set of installation programs that are provided with the install manager. When a component manager, such as component manager 110, reaches the install phase for a specific component resource, it calls the install 132 manager and passes in the <Install> tag from the component resource's <SOFTPKG> block. The install manager then interprets the XML statements in the <Install> tag block and, in the case of built-in installers, runs the installer code in-line.

There can be several types of built-in installers. An illustrative example is an "InProc Server" installer that copies the downloaded file from the staging area either to a predefined executable directory or to a specified target directory and then loads the DLL, and calls its DllRegisterServer entry point. Another built-in installer called a "Copy" installer could simply copy the file from the staging area to the predefined executable directory unless another target directory is specified. The following are XML statements for the previous examples.

<Install Type="InProc Server"/>
<Install Type="Copy" TargetDir="c:\Program Files\My App"/>

Alternatively, the installation program may be a third party application which itself must be downloaded. If a component developer requires a custom installer, the installer would be downloaded by making it a dependency of the to-be-installed component resource and then specifying the installer in the <Install> tag for the component resource. In general, an external installer is a stand-alone executable that the installation manager launches. When a component manager launches an external installer, it can provide a number of different parameters on the installer's command line. The model is basic keyword substitution. Whatever part of the command line is not keywords is passed as is to the installer intact. Some possible keywords are:

$STAGINGFILE$ the staging file for the current <SOFTPKG>

$STAGINGDIR$ the root of the staging file directory $TEMPDIR$ the system temp directory $GROOVEBIN$ the predefined executable directory $GROOVEDATA$ a data directory Some mechanism must also be used to determine whether the installation program has successfully completed. Illustratively, this can be performed by launching each external installer on a newly spawned thread. That thread then performs a WaitOnSingleObject for the installer to complete. When the installer exits, the component manager captures the process exit code. A non-zero code is considered to be an error and will prevent any dependent component resources from being processed.

Components may be installed on a device without the knowledge of the system component manager. For example, a Shockwave player can be installed directly by a user or by the system component manger in response to the use of Shockwave in a shared space (SHOCKWAVE is a trademark of Macromedia, Inc. 600 Townsend Street, San Francisco, Calif. 94103.) Continuing this example, assume that Shockwave has been installed directly by the user and that the system component manager has just received a request for that same component. Since Shockwave is not listed in the Manifest, the system component manager would normally download and install Shockwave again, needlessly consuming the user's network connection. However, the author of the OSD file can specify a <g:InstallTest> element which will cause the system component manager to first test for the existence of Shockwave before downloading it. If it does exist, the system component manager skips to the component publish phase. An install test is also useful for external installers which might have failed or been canceled without the knowledge of the system component manager. Some example types of InstallTests include CoCreate tests, file exists tests, file date time tests and registry tests.

Figure 9A:
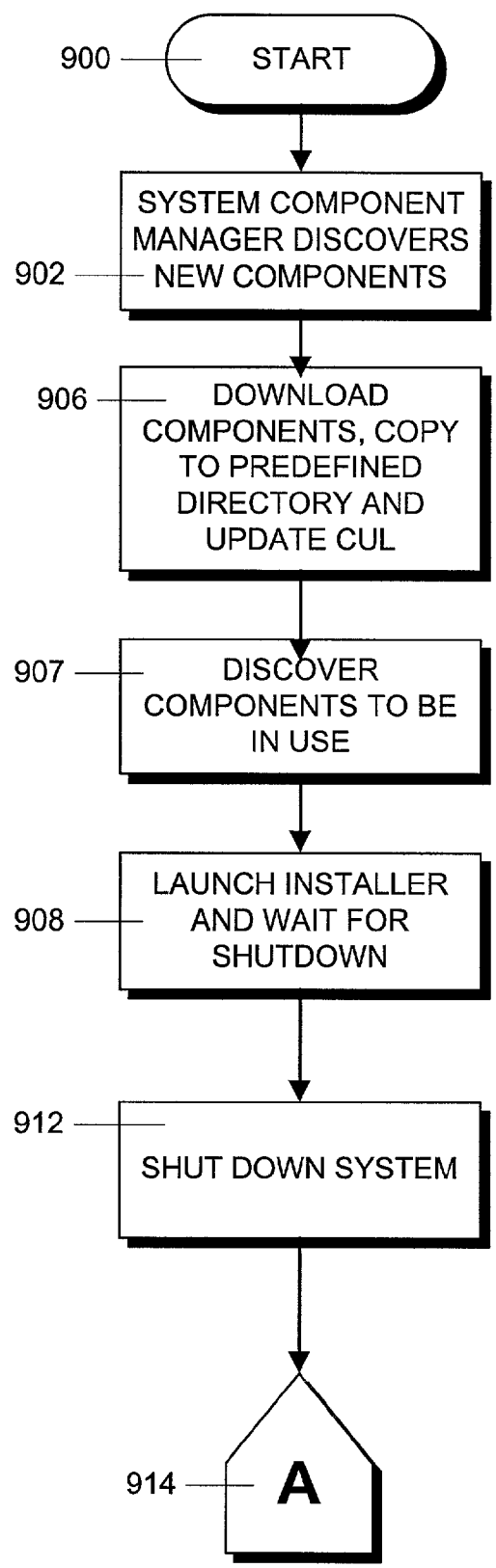
FIGS. 9A and 9B, when placed together, form a flowchart showing steps in an illustrative process for installing system component updates in a collaborative system that is already running.
Figure 9B:
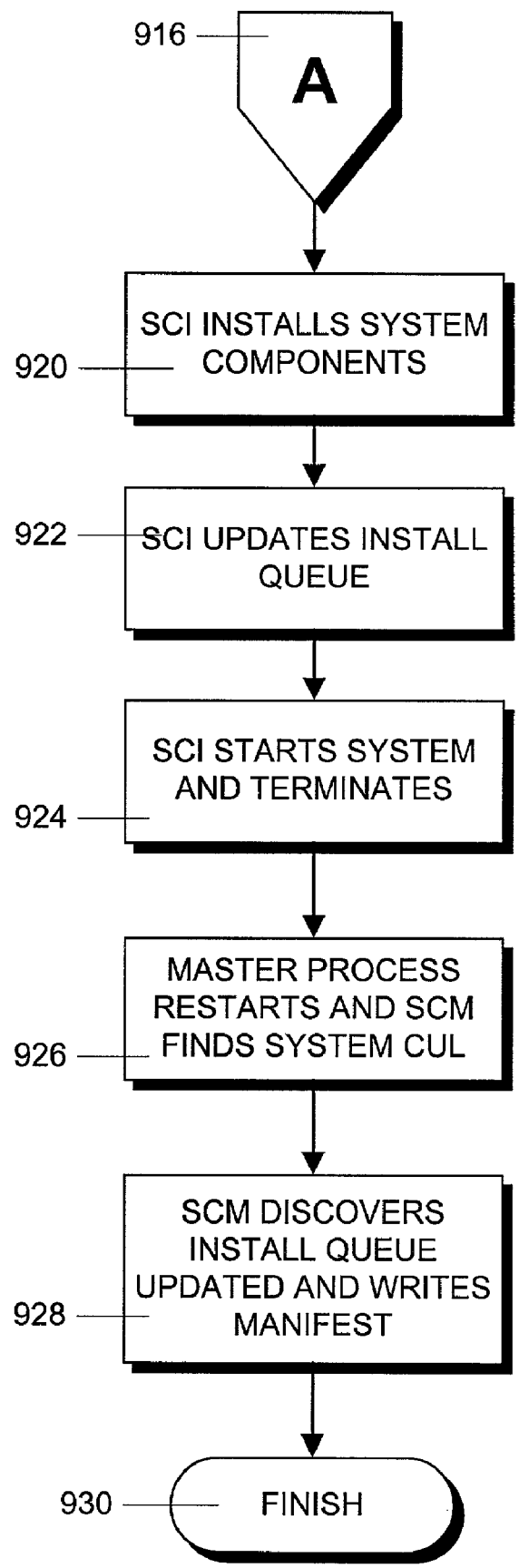

The installation of collaboration system components (for example, the storage manager) is accomplished with a system component installer (136, FIG. 1.) The system component installer 136 is unique because, in order to install system components or other in-use components, the collaborative system itself cannot be running. Thus, a thread cannot be used to track the completion of the installation process. FIGS. 9A and 9B, when placed together, form a flowchart that shows the steps in an illustrative process for installing in-use component updates in a collaborative system that is already running. The process begins in step 900 and proceeds to step 902 where the system component manager 216 (FIG. 2) running in the master process 214 discovers the need for new in-use components.

Next, as shown in step 906, the system component manager 216 downloads the new components, copies them to a predefined directory (such as the system component list 228 as indicated by arrow 224) and updates the persisted system CUL 234. In step 907, the Install Manager attempts to install a component and discovers it to be in-use. It next enqueues the installation to the system installer. In fact, all subsequent installations that are part of the current CUL must be enqueued to the system installer once the first in-use component is discovered. This requirement is born of the necessity to guarantee the order in which the components are to be installed. Once all of the installation requests for the current CUL have been enqueued to the system installer, the install manager 132 prompts the user to restart the collaborative system. Until that happens, all system component manager activity is halted.

Then, in step 920, the system component installer 222 installs all the system components. In step 922, the system component installer 222 updates the install queue document 224 indicating that the installation process has been completed, including any error information. The system component installer 222 then starts the collaborative system and terminates in step 924. In step 926, the master process 214 (and the system component manager 216 in it) restarts and the system component manager 216 finds in the persistent storage area 220, a half-completed system CUL 234 for the system components. When it starts, the system component manager 216 restarts where it left off processing the system CUL 234. The system component manager 216 discovers, in step 928, that the install queue has been updated and completes the component update by writing the new components to the manifest 236 and deleting the system CUL 234. The process then finishes in step 930.

The instantiation of an installed component can be requested by some higher component. The component manager supports component activation by invoking the appropriate "factory" for the requested component. A factory is simply an object that can instantiate certain other kinds of objects. Factories have a well-defined interface that the component manager understands. The interface between the factory and the requested component is usually designed by the factory/component creator.

The collaboration system can include several built-in activation factories but third parties can also download their own factories provided the new factory is launched by one of the built-in factories. Some components, for example GIFs, will not be activated by the collaboration system but merely used directly by some other component. Any given version of a component will most likely be activated many times but only downloaded and installed once.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the scope and arrangement of the federated beans. Other aspects, such as the specific process flow, as well as other modifications to the inventive concept are intended to be covered by the appended claims.

What is claimed is:

1. A peer-to-peer collaboration system comprising a plurality of peer devices, each peer device comprising a computer system with a memory and a computer-readable medium having computer executable modules in the memory, the modules comprising:

an activity program adapted to implement a portion of a collaboration session on a first peer device of the plurality of peer devices, the activity program establishing a local copy of the shared space and modifying a local data copy of the shared space in response to deltas generated as a result of user actions within the collaboration system at the first peer device and other peer devices of the plurality of peer devices, and the activity program generating a component update request in response to an action by a user within the collaboration session, the user action indicating an addition or update to the local copy of the shared space;

a component manager that receives the component update request from the activity program and has a parser that extracts from the request URL information which identifies the location of a file containing software component resources for satisfying the component update request;

a download manager that receives the URL information from the component manager and has a file retriever which asynchronously retrieves the file from the specified location and places the file in a staging area in the memory; and an install manager that asynchronously installs the file, wherein the component manager is adapted to determine whether the requested software component is already installed on the peer device and to selectively invoke the download manager based on the determination.

2. The apparatus of claim 1, wherein:
the peer-to-peer collaboration system further comprises a second peer device; and
the activity program comprises a first activity program and is installed on the first peer device;
the system comprises a second activity program installed on the second peer device; and
the action by the user comprises interaction with the second activity program.

3. The apparatus of claim 1 wherein the component manager comprises a security section that validates the file before installation.

4. The apparatus of claim 1 further comprising a manifest which contains a list of all software components installed on the computer system.

5. The apparatus of claim 4 wherein the component manager comprises a mechanism that responds to the request by checking the manifest to ascertain whether the requested software component is already installed on the computer system.

6. The apparatus of claim 1 wherein the component manager comprises a polling mechanism that periodically polls component locations to locate new component versions.

7. The apparatus of claim 5 wherein the software component may be a system component that is required for operation of the apparatus or an application component that is not required for operation of the apparatus and wherein the apparatus further comprises a system component manager that receives a request for the system component and a system component installer that is started by the system component manager.

8. The apparatus of claim 2 wherein the first activity program generates the update request in response to receiving an invitation for a user of the first device to join the collaboration session, the invitation being generated in response to an action by a user of the second device within the collaboration session.

9. The apparatus of claim 1 wherein the component comprises a tool and the change to the shared space comprises instantiation of a template for the tool.

10. The apparatus of claim 7 wherein the component manager comprises an activation factory for activating installed software components.

11. A method of operating a peer device with a memory as part of a peer-to-peer collaboration system comprising at least one other peer device maintaining a first local data copy of a shared space, the method comprising:
(a) implementing a portion of a collaboration session on a first peer device of a plurality of peer devices, the implementing comprising establishing a local copy of the shared space and modifying the local data copy of the shared space in response to deltas generated as a result of user actions within the collaboration system at the first peer device and other peer devices of the plurality of peer devices;
(b) generating a component update request in response to receiving information about a component being used in a collaboration session involving the at least one other peer device, the component update request identifying the component, and the received information being generated dynamically while the collaboration system is in operation to modify the shared space based on input of a plurality of users collaborating using the peer-to-peer collaboration system;
(c) parsing the request to extract from the request URL information which identifies the location of a file containing software component resources for satisfying the request and an identification of the component;
(d) determining, based on the identification of the component, availability of the component;
(e) selectively in response to the determination, using the URL information to asynchronously retrieve the file from the specified location; and
(f) asynchronously installing the component from the file, whereby the computer system can use the component to maintain a second local data copy of the shared space that is synchronized with the first local data copy.

12. The method of claim 11 wherein receiving information about a component comprises receiving an invitation to join a collaboration session.

13. The method of claim 11 further comprising:
(f) validating the file before installation.

14. The method of claim 11 further comprising:
(f) operating the computer system to implement a portion of the collaboration session using the component.

15. The method of claim 11 wherein step (e) comprises checking a manifest to ascertain whether the requested software component is already installed on the computer system before retrieving the file.

16. The method of claim 11 further comprising:
(f) periodically polling component locations to locate new component versions.

17. The method of claim 11 wherein the component may be a system component that is required for operation of the apparatus or an application component that is not required for operation of the apparatus and wherein the method further comprises:
(f) when the component is a system component, installing the component with a separate system component manager, which receives a request for a system component, and a separate system component installer that is started by the system component manager.

18. The method of claim 17 wherein step (f) comprises shutting the system component manager down before installing in-use components.

19. The method of claim 18 wherein step (f) further comprises restarting the system component manager after the system component has been installed.

20. The method of claim 11 further comprising:
(f) activating the installed software component with an activation factory.

21. A computer program product stored on a computer readable medium for use in a peer-to-peer collaboration system including a peer device with a memory, the peer device being adapted to receive an update request generated as a result of user interaction with the peer-to-peer collaboration system by a plurality of members of a collaboration session, the computer program product comprising:
program code for running a process that maintains a local copy of a shared space, the process being adapted to respond to input from the plurality of members and generates a request to update a component used in modifying the local copy of the shared space, the request being generated in response to user input indicating use of the component;
program code that extracts from the request information which identifies the location of a first file for satisfying the request;
program code that uses the information to retrieve the first file;

program code that extracts from the first file an indicia of a trusted supplier and obtains second location information of a second file, the second file containing a second component;

program code that uses the second location information to retrieve the second file;

program code to extract from the second file the second component and an indicia of a supplier of the second component; and program code that selectively installs the second component when the indicia of the supplier is consistent with the indicia of a trusted supplier.

22. The computer program product of claim 21 wherein the first file contains an OSD description of the software component, including dependent components.

23. The computer program product of claim 21 wherein the program code that retrieves the second file is the same program code that retrieves the first file.

24. The computer program product of claim 21 wherein the program code that extracts from the first file the indicia of a trusted supplier extracts a fingerprint of a trusted supplier.

25. The computer program product of claim 21 wherein the program code that uses the information to retrieve the file from the specified location comprises program code that checks a manifest to ascertain whether the requested software component is already installed on the computer system before retrieving the file.

26. The computer program product of claim 21 wherein the program code that selectively installs the second component selectively prompts a user for authorization to install the second component when the indicia of the supplier is not consistent with the indicia of a trusted supplier.

27. The computer program product of claim 21 wherein the software component may be a system component that is required for operation of the apparatus or an application component that is not required for operation of the apparatus and wherein the computer program product further comprises program code that installs a system component with a separate system component manager that receives a request for the system component and a separate system component installer that is started by the system component manager.

28. The computer program product of claim 27 wherein the program code that installs system components with a separate system component manager and a separate system component installer comprises program code that shuts the system component manager down before installing in-use components.

29. The computer program product of claim 28 wherein the program code that installs the system component with a separate system component manager and a separate system component installer further comprises program code that restarts the system component manager after the system component has been installed.

30. The computer program product of claim 21 further comprising program code that activates installed software components with an activation factory.

31. A peer-to-peer collaboration system comprising a peer device with a memory and at least one other peer device maintaining a first local data copy of a shared space, the peer device comprising:

means for implementing a collaboration session for a user, the means for implementing adapted to maintain a local copy of a data space shared by a plurality of collaborating members in the collaboration session and to receive an indication of a component in use within the collaboration session involving the at least one other peer device and to selectively generate an update request for the component based on the indication of use within the collaboration session;

means responsive to the request, for parsing the request to extract from the request URL information which identifies the location of a file containing software component resources for satisfying the request;

means for receiving the URL information and asynchronously retrieving the file from the identified location; and means cooperating with the parsing means for installing the component from the file while the collaboration system is executing, whereby the peer device can use the component to maintain a second local data copy of the shared space that is synchronized with the first local data copy.

32. The apparatus of claim 31 further comprising means for selectively deferring installation of the component until the collaboration system is not executing.

33. The apparatus of claim 31 wherein the parsing means comprises means for validating the file before installation.

34. The apparatus of claim 31 further comprising a manifest which contains a list of all software components installed on the computer system.

35. The apparatus of claim 34 wherein the parsing means comprises means responsive to the request for checking the manifest to ascertain whether the requested software component is already installed on the computer system.

36. The apparatus of claim 31 wherein the parsing means comprises means for periodically polling component locations to locate new component versions.

37. The apparatus of claim 31 wherein the software component may be a system component that is required for operation of the apparatus or an application component that is not required for operation of the apparatus and wherein the apparatus further comprises a system component manager that receives a request for the system component and a system component installer that is started by the system component manager.

38. The apparatus of claim 37 wherein the system component installer comprises means for shutting the system component manager down before installing an in-use component.

39. The apparatus of claim 38 wherein the system controller comprises means for restarting the system component manager after system component has been installed.

40. The apparatus of claim 31 wherein the parsing means comprises means for activating installed software components.

* * * * *